(12) United States Patent
Geller et al.

(10) Patent No.: US 6,236,990 B1
(45) Date of Patent: *May 22, 2001

(54) METHOD AND SYSTEM FOR RANKING MULTIPLE PRODUCTS ACCORDING TO USER'S PREFERENCES

(75) Inventors: Mark S Geller; David R Rubin, both of Palo Alto, CA (US)

(73) Assignee: Intraware, Inc., Emeryville, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/938,918

(22) Filed: Sep. 26, 1997

Related U.S. Application Data (63) Continuation-in-part of application No. 08/680,914, filed on Jul. 12, 1996.

(51) Int. Cl.[7] .............................. G06F 17/30; G06F 15/16
(52) U.S. Cl. .................................. 707/5; 707/10; 709/203
(58) Field of Search .................................. 705/26, 27, 7, 705/10

(56) References Cited

U.S. PATENT DOCUMENTS

| | | | |
|---|---|---|---|
| 4,996,642 | * | 2/1991 | Hey .......................................... 705/27 |
| 5,550,746 | * | 8/1996 | Jacobs .............................. 364/479.01 |
| 5,717,865 | * | 2/1998 | Stratmann ............................... 705/10 |
| 5,717,923 | * | 2/1998 | Dedrick ................................. 707/102 |
| 5,721,832 | * | 2/1998 | Westrope et al. ....................... 705/27 |
| 5,731,991 | * | 3/1998 | Kinra et al. ...................... 364/551.01 |
| 5,754,850 | * | 5/1998 | Janssen ................................. 707/104 |
| 5,754,938 | * | 5/1998 | Herz et al. .............................. 455/4.2 |
| 5,872,850 | * | 2/1999 | Klein et al. .............................. 380/49 |
| 5,884,282 | * | 3/1999 | Robinson ................................ 705/27 |
| 5,890,175 | * | 3/1999 | Wong et al. ........................... 707/505 |
| 5,897,639 | * | 4/1999 | Greef et al. ........................... 707/103 |
| 5,913,202 | * | 6/1999 | Motoyama ............................... 705/35 |
| 5,937,389 | * | 8/1999 | Maxwell ................................. 705/10 |
| 5,950,172 | * | 9/1999 | Klingman ............................... 705/26 |
| 5,970,473 | * | 10/1999 | Gerszberg et al. ..................... 705/26 |
| 6,029,195 | * | 2/2000 | Herz et al. ............................ 709/219 |
| 6,038,554 | * | 3/2000 | Vig ........................................ 705/400 |
| 6,041,311 | * | 3/2000 | Chislenko et al. ...................... 705/27 |
| 6,049,777 | * | 4/2000 | Sheena et al. .......................... 705/10 |

FOREIGN PATENT DOCUMENTS 0 265 083 * 4/1988 (EP) ............................... G09F/27/00

OTHER PUBLICATIONS

"Personalogic: PersonaLogic Inc. Launches Breakthrough Web–Based Personalized Decision Guides"; Business Wire [online]. Retrieved from Dialog Information Services, Accession No. 0723048, Jul. 1997.*

* cited by examiner

Primary Examiner—Reba I. Elmore
(74) Attorney, Agent, or Firm—Charles E. Gotlieb (57) ABSTRACT

A system and method assists a user in selecting a product from multiple products, grouped into categories. Information about the product is received and stored. Attributes about the products of each category, and questions related to the attributes are received and stored. Possible responses to the questions and weights associated with each possible response are also received and stored. Evaluation ratings for each of the attributes of each of the products are received and stored. The user selects a category and is provided with questions corresponding to the attributes of the products in the category selected. For each product in the category, a product score is calculated by summing the product of the weights of the responses by the evaluation ratings for that product. The results are displayed, organized into rows and columns in the order of the product scores and weights. The user may change the weights, change categories, or obtain additional information, such as information about each product, attribute or the evaluation ratings, and may place an order for some or all products.

21 Claims, 4 Drawing Sheets

METHOD AND SYSTEM FOR RANKING MULTIPLE PRODUCTS ACCORDING TO USER'S PREFERENCES

RELATED APPLICATIONS

This application is a continuation-in-part of application Ser. No. 08/680,914 entitled, "SYSTEM AND METHOD FOR VENDING RETAIL SOFTWARE AND OTHER SETS OF INFORMATION TO END USERS" filed on Jul. 12, 1996 now U.S. Pat. No. 6,092,105 by Jonathan P. Goldman and having the same assignee as this application and is incorporated herein by reference in its entirety.

FIELD OF THE INVENTION

The present invention is related to computer software and more specifically to computer software for selection of products.

BACKGROUND OF THE INVENTION

Selecting a product from a number of competing products can be a difficult task. To make an initial selection, the user may rely on the packaging, which is biased towards the product inside and may not provide all the information a user might need for comparison. Selecting a computer hardware or software product is especially difficult because the product may not be available for trial use before the user pays for it.

In the case of computer software, if the user decides after using software for a short period that the software will not meet his or her needs, some retailers will not accept it for return. This inhibits potential purchasers of computer software from purchasing products.

To make software available for trial use, special trial versions of a product may be made available by a manufacturer of the software so that a user can try a copy for a limited time or to perform limited functions. However, to test the software against other similar products, the user is required to learn how to use all of them, a time consuming task. Because some trial versions have only limited functionality or allow a limited duration use, the user may not be able to identify all of the features that he or she might find important. In addition, not all manufacturers wish to go through the trouble of creating trial versions of their products, so a user who is willing to learn and compare competing products may not have many trial versions of products against which to compare.

Computer hardware can be tried and returned, but the hardware must be checked to ensure that it was not damaged and the contents of the package are complete, a time consuming and costly process for the retailer that is prone to error. In addition, the return process is time consuming to the user who may have to bring the product to the retailer where it was purchased and wait for the retailer to check the product.

Some magazines have attempted to fill the need to assist potential users with the product selection process. PC Week and Consumer Reports are examples of magazines that attempt to offer advice on the selection of computer hardware and software products. PC Week recommends to its readers one or more products from multiple competing products. However, because consumers have widely varying needs, the product recommended may not be the best product for each user. Consumer Reports rates each product on a five point scale on how well it performs a few functions, allowing the user more flexibility in selection, but requiring the user to weigh the importance of each function in order to come to a conclusion. In the case of computer products, both magazines become quickly outdated because of the rapid pace of technological improvements. In addition, the same products are not reviewed in each edition, necessitating a search for back issues that may not be available at the place of purchase of the product.

It is therefore desirable to assist a user with selecting a product without requiring the user to learn how to use, or to purchase and return, multiple products, in a manner that can be kept up to date as new products appear and existing products are updated, that can be tailored to the user's requirements and that can be made available at the place of purchase of the product.

SUMMARY OF INVENTION

A method and system stores a product catalog, which includes product names and can include a category for each product. Attributes for each product category are identified and products within each category are evaluated by experts who can compare each of the products and how they rate with respect to each attribute. Each of the products in each category is rated for compliance with the attributes identified, for example using a 100-point scale, and the ratings are stored. The user is prompted to select a category. For the category selected, stored prompts are provided to the user, allowing the user to weigh the importance of each attribute, and this preference information is stored. The preference and rating information stored is used to rank each product within the category and provide the ranking to the user, tailored to the preferences of the user. The user can change a preference and recalculate the rankings based on the new preference information. The user can obtain additional evaluation information, and can order the product. The catalog, attributes, prompts and evaluation information is remotely updatable.

Because experts test and evaluate the products, and the preference of the user is used to rank each product in a category, the user is able to see product rankings that are tailored to his or her requirements without requiring the user to learn how to operate multiple competing products, or to purchase and return those not suitable. Because the system is remotely updatable, attribute and rating information can be kept up to date, and always available at the point of purchase.

DETAILED DESCRIPTION OF A PREFERRED EMBODIMENT

Figure 1:
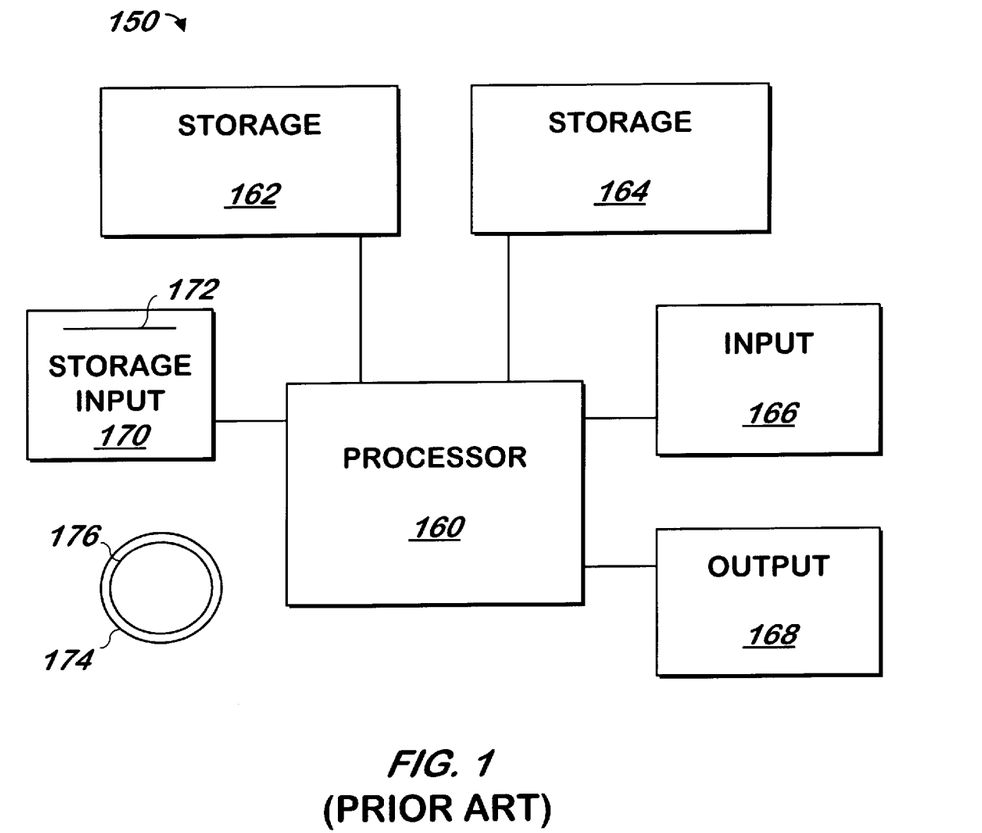
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM compatible computer running the Microsoft Windows 95 operating system, although other systems may be used.

Figure 2A:
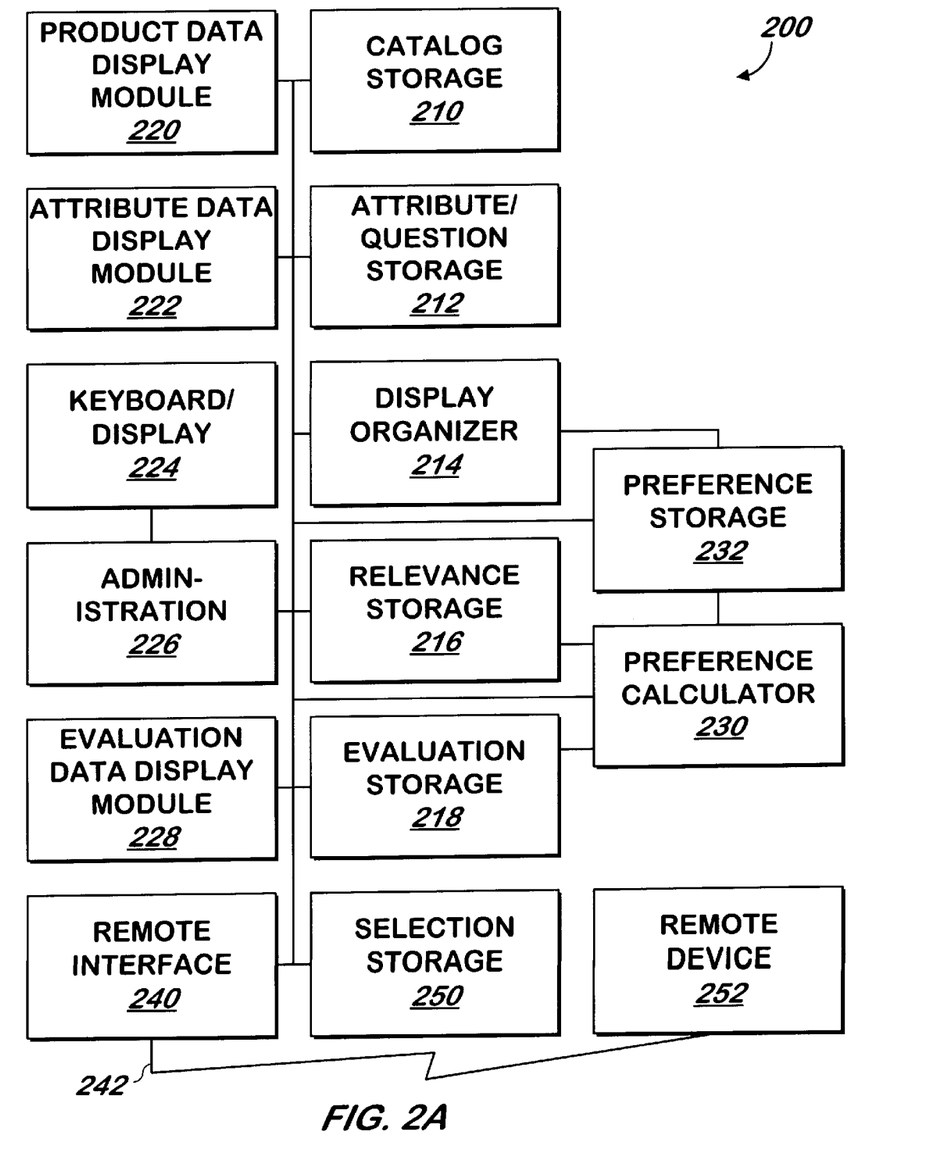
FIG. 2A is a block schematic diagram of a system for ranking multiple products according to a user's preferences according to one embodiment of the present invention.

Referring now to FIG. 2A, a system for ranking multiple products according to a user's preferences according to one embodiment of the present invention is shown.

Catalog storage 210, made of a storage device such as memory or hard disk storage, stores the name and an internal identifier for each product input to the system 200. Catalog storage 210 also contains a name and internal identifier of the one or more categories with which each product will be identified. In one embodiment, each category has its own unique name, such as "Word Processing Software" and a corresponding internal identifier for the category. In one embodiment, each product may be assigned into multiple categories.

Attribute/question storage 212, made of a storage device such as memory or hard disk storage, stores a set of attributes, and one or more questions corresponding to each attribute. Each product category described above may be related to one or more of the attributes stored in attribute/ question storage 212 and the relationships may be stored in attribute/question storage 212, or in catalog storage 210.

Each attribute relates to a feature of a category of products, such as whether the product integrates with a spreadsheet. The attribute may consist of a description such as, "Integrates with a Spreadsheet" and an internal identifier of the attribute.

The questions stored in attribute/question storage 212 prompt the user to describe the relevance to the user of the attribute. For example, for the attribute, "Integration with a Spreadsheet," a question may be "How important is integration with a spreadsheet?" Each question may be related to one or more attributes, and may consist of the text of the question and an internal identifier.

In one embodiment, the text of possible responses to the questions and a corresponding numerical weight of the response may be stored and associated with each question in attribute/question storage 212. For example, the responses may be "Irrelevant", "Not Very Important", "Fairly Important", "Very Important" and "Critical" with corresponding weights of 0, 1, 2, 3 and 4, respectively.

Evaluation storage 218 stores an evaluation of the attributes of some or all products having an identifier in the catalog storage 210. A numerical rating on a 100-point scale with 100 being a perfect score of how the product satisfies the attribute is stored associated with the internal identifier of the product and the attribute identifier to which the rating corresponds, although other scoring systems may be employed. In one embodiment, the evaluation storage stores the rating and a pointer to the product information stored in catalog storage 210. In addition, additional information about the rating such as a verbal explanation describing how the rating was arrived at is also stored and associated with each rating in evaluation storage 218.

In one embodiment, catalog storage 210, attribute question storage 212 and evaluation storage 218 are a conventional database, with a table for the product information, a table for attribute and question information, and a table for evaluation information.

Administration 226 prompts the user to select a category of products via keyboard/display 224 which is a conventional input device such as a keyboard and a mouse, and a conventional output device such as a conventional computer display screen. When a category is selected by the user using keyboard/display 224, the selection is received by administration 226 which retrieves the questions and possible responses stored in attribute/question storage 212 for display to the user one at a time via the display of keyboard/display 224. The user can then provide to administration 226 via keyboard/display 224 actual responses describing the relevance of each attribute by selecting one of the possible responses using the keyboard/display 224. The actual responses the user selects for each attribute are received by administration 226 which stores in relevance storage 216 a representation of the actual responses, such as the weight corresponding to the response selected and an indication or an association of the response with the attribute. In addition, administration 226 stores the category selected in relevance storage 216.

When administration 226 has received responses to all the questions for a category, or the user indicates to administration 226 that the user wishes to proceed without responding to the remaining questions, administration 226 signals preference calculator 230. Preference calculator 230 calculates a score for each product in the category selected. In one embodiment, the score is calculated using the following procedure: for each product in the category, the weight for each attribute is multiplied by the evaluation rating for such attribute for such product to produce an interim result. The sum of all such interim results for each product in the category is calculated to produce a product score. In one embodiment, the product scores are normalized by dividing the sum of all interim results by the sum of the weights. In one embodiment, the results are multiplied by 100 and divided by the highest possible product score to normalize the scores to a 100 point scale.

For example, assume the category selected has two attributes A1 and A2, and three products P1, P2 and P3 in that category, the user has selected responses corresponding to weights of 1 for A1 and 2 for A2. The evaluation ratings for attributes A1 and A2 are, for product P1, 80 and 70, for product P2, 90 and 70, and for product P3, 70 and 60, respectively. The product score for product P1 is ((80×1)+ (70×2))/3, or 73.33. The product score for product P2 is ((90×1)+(70×2))/3, or 76.67. The product score for product P3 is ((70×1)+(60×2))/3, or 63.33.

Preference calculator 230 passes the product scores associated with the identifier of the corresponding product to preference storage 232, which may be any storage device such as memory or disk, and preference storage 232 stores the product scores. In one embodiment, preference storage 232 is a part of the database described above, and the product score, calculated by preference calculator 230, is stored in another field of the database in the product table. In one embodiment, the interim results are also stored in preference storage 232 as additional fields in the database record in the product table.

Display organizer 214 assigns an order to the attributes in order of the preference weights, and assigns an order to the products in the category selected in order of the product score of those products, with the highest preference and highest product score first. Using the examples above, display organizer 214 would assign an order of 1 to attribute A1 and an order of 2 to attribute A2, because A2 has the highest weight and A1 has the second highest weight. Display organizer 214 assigns an order of 1 to product P2, 2 to product P1 and 3 to product P3, assigning an order of 1 to the product with the highest product score, and assigning subsequent orders to products in order of the product score.

Display organizer 214 stores these orders in a portion of display organizer 214 made from memory or disk. In another embodiment, display organizer 214 stores the orders of the attributes and associates the orders with the corresponding attribute in attribute/question storage 212 and stores the orders of the products in catalog storage 210, associated with the corresponding product.

When display organizer 214 has completed assigning the orders to the attributes and the products, display organizer 214 signals administration 226 in one embodiment. In another embodiment, the orders are provided to administration 226 by display organizer 214 as they are computed.

Administration 226 retrieves the orders stored in display organizer 214, and displays the product name of each product in the category, the product score and the associated evaluation scores for that product in a row of the display of keyboard display 224. Each of the rows containing this information is arranged in order of the ordering for the product, with the first row holding the name, product score and evaluation scores for the product having an order of 1.

The first column of the display of keyboard/display 224 lists the product name, and the remaining columns list the evaluation score, or a symbol representing a range of evaluation scores, of each of the attributes in order of the attribute ordering performed by display organizer. The attribute with the highest weight selected is displayed in the second column, and the remaining columns in the display of keyboard display 224 display the other attribute ratings in order of decreasing value of the attribute weights. In the first row of the display of keyboard/display 224, administration 226 displays column headings for each column. For example, column headings include the words "Product/Score" in column 1 of the display and a short description of each attribute stored in attribute/question storage 212 in the remaining columns of the display according to the ordering provided by display organizer 214.

Figure 2B:
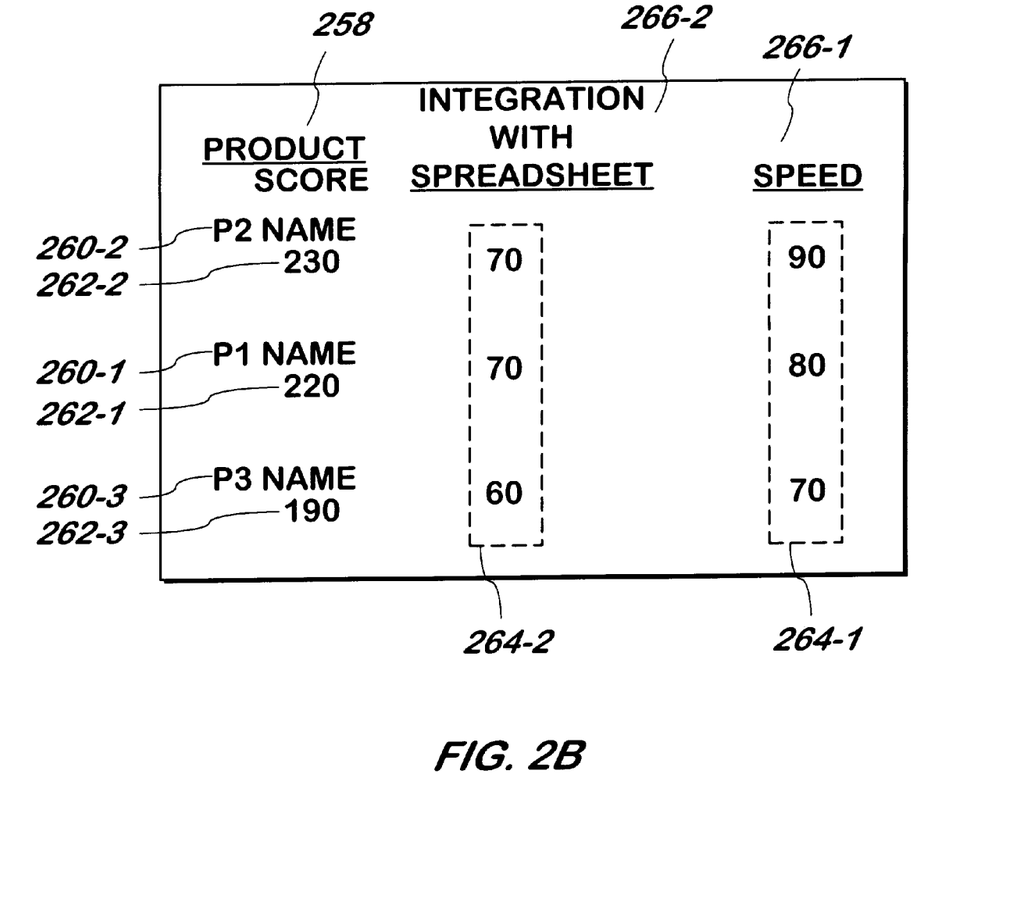
FIG. 2B is a display screen showing product names and product scores, and ratings for three products, displayed according to one embodiment of the present invention.

Referring now to FIG. 2B, the display screen 258 of keyboard/display 224 of FIG. 2A is shown. Product names 260-1, 260-2, 260-3 for products P1, P2 and P3, respectively, are shown with the product scores 262-1, 262-2, 262-3 for products P1, P2, and P3, respectively, as calculated in the example above. The product names and scores are displayed in order of the order of the product. The text of attribute 1 266-1 and attribute 2 266-2 are displayed in order of the order of each attribute. Underneath the text of the attributes 266-1, 266-2 are the evaluation scores 264-1, 264-2 for each product, with the evaluation scores 264-1, 264-2 for a product in the same row as the name 260-1, 260-2, 260-3 and score 262-1, 262-2, 262-3 for the product.

Referring again to FIG. 2A, the user can request administration to change the category or the relevance of one or more attributes of any category selected using keyboard/display 224. Administration 226 displays some or all of the questions corresponding to the category most recently selected and stored in attribute/question storage 212. Administration 226 substitutes in relevance storage 216 the actual responses received in place of those provided earlier and signals preference calculator 230 to recalculate the interim and product scores. Administration 226 signals display organizer 214 to reassign the order of the attributes and products, and display organizer 214 assigns these orders as described above. Administration redisplays the information, modified according to any changes made by the user.

The user may obtain additional information using keyboard/display 224. The user can position the mouse pointer over the information arranged in rows and columns described above. The user can obtain general information such as price and availability about any product on the display by positioning the mouse pointer in the first column and the row corresponding to the product about which the additional information is desired and single clicking. The additional information is stored as catalog information in catalog storage 210. Administration 226 identifies the row and column of the display from the position of the mouse cursor transmitted by an operating system such as the Windows 95 operating system commercially available from Microsoft corporation of Redmond, Wash., and passes the product identifier to product data display module 220. Product data display module 220 retrieves the product information from catalog storage 210 and passes it to administration 226 for display to the user via the display of keyboard/display 224.

Administration 226 presents the user with an option to purchase the product via keyboard/display 224 and if the user indicates he or she wishes to purchase the product, administration 226 stores an identifier of the product in selection storage 250 for use in ordering the product. An order may be stored for reference, printed via a printer (not shown) attached to administration 226 or transmitted to a remote device 252 via the remote interface 240, described below.

The user can position the mouse cursor over the column headings and single click a mouse button using keyboard/display 224. Administration 226 identifies the column and the fact that the user has positioned the mouse cursor over the heading using the operating system and passes the attribute identifier to attribute data display module 222. Attribute data display module 222 retrieves a more detailed explanation of the attribute stored in attribute question storage 212 and passes it to administration 226, which displays the more detailed explanation to the user via keyboard display 224.

The user can obtain additional information about how a product was evaluated for compliance with an attribute by positioning the mouse cursor over the column corresponding to the attribute and the row corresponding to the column and single clicking a mouse button using keyboard/display 224. Administration 226 signals evaluation data display module 228, which retrieves the additional information from evaluation storage 218 and passes it to administration 226 for display to the user using keyboard/display 224.

New information or updates for the information stored in catalog storage 210, attribute question storage 212, and evaluation storage 218 are received either by keyboard/display 224 or from a remote device 252 connected via input 242 of remote interface 240. Remote interface 240 may be any communications interface such as a modem or connection to the Internet. New information or changes to existing information are received from a remote device 252 by remote interface 240, which passes the information to administration 226. Administration 226 directs the information to the appropriate one of catalog storage 210, attribute question storage 212, or evaluation storage 218 for storage for subsequent use as described above. The remote device is a device that is more than a specified distance such as a kilometer, ten kilometers or a mile away from the remote interface 240.

In one embodiment, administration 226 stores in election storage 250 statistical information about which category was selected, which preferences were made and whether any product was ordered so that the system 200 may be evaluated with respect to use by one or more users.

Figure 3:
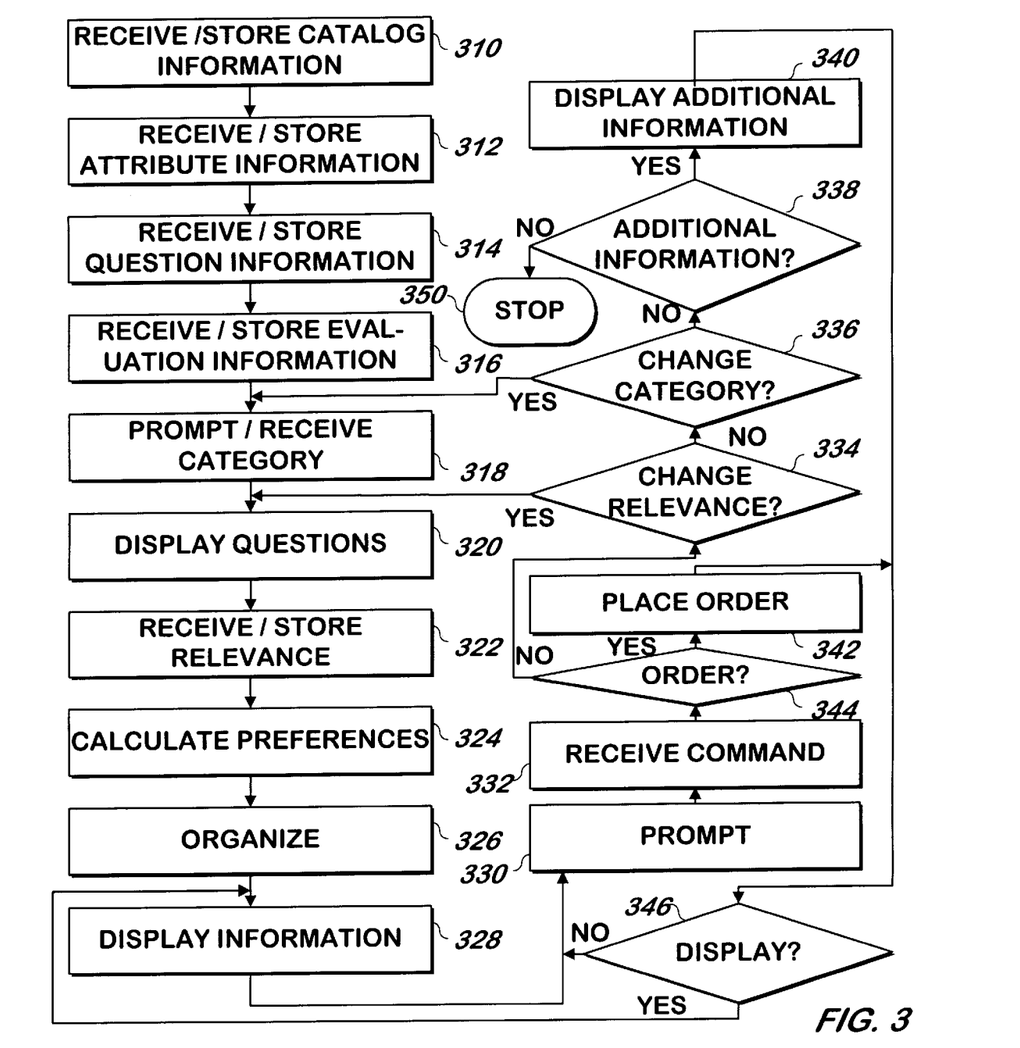
FIG. 3 is a flowchart illustrating a method of ranking multiple products according to a user's preferences according to one embodiment of the present invention.

Referring now to FIG. 3, a method of ranking products is shown according to one embodiment of the present invention. Catalog information, such as the name of a product, manufacturer, price, availability, category and other information about more than one products are received and stored 310.

Attribute information about some or all of these products are received and stored 312. Attribute information may contain one or more attribute descriptions, and may contain additional information as described above. Attributes describe features or benefits of one or more products, such as the ability of a word processor product to integrate with a spreadsheet product. In one embodiment, attribute information is an attribute identifier, attribute text and additional information that describes the attribute. In another embodiment, each attribute is a record in a database containing this information. The attribute may also be stored in a manner that relates the attribute to a category of a product, for example by assigning each category an identifier and associating the attribute with one or more category identifiers.

Question information related to one or more of the attributes are received and stored 314. Question information may include the text of a question, possible responses to the question and associated weights, and other additional information such as a more detailed explanation of the question. A question may be "How important is integration with a spreadsheet?" Although the questions received and stored in step 314 may be in the form of a question, they may also be in any other form such as a statement, or a fragment, such as "Integration with Spreadsheet." In one embodiment, each attribute has an identifier and the question is stored associated with the identifier. In another embodiment, the question is related to an attribute by being stored in an attribute's record. Possible responses to a question describe two or more answers to a question, such as "Critical", "Very Important", "Fairly Important", "Not Very Important" or "Irrelevant", and may include a weight value for each possible answer. For example, "Critical" may have a weight of 4, "Very Important" may have a weight of 3, "Fairly Important" may have a weight of 2, "Not Very Important" may have a weight of 1 and "Irrelevant" may have a weight of 0. In one embodiment, the weight of each possible response is implied by the order of the possible response received. Additional question information may include a more detailed discussion of the question and what is to be interpreted from each of the possible answers.

Evaluation information is received and stored 316. Evaluation information contains an evaluation rating and may contain additional information. Evaluation ratings contain a product reference and an objective numeric or other score that describes how well one or more products fulfills the attribute or question associated with the attribute. In one embodiment, the evaluation rating is stored so that it is related to both an attribute and a product. This relationship may be indicated by storing the evaluation rating as a field in a record containing either the attribute, question or product information, with an identifier referencing any one of the product information or attribute or question that is not part of the record. In another embodiment, the evaluation rating is not part of either a product or attribute record and identifiers are associated with the rating for both a product and an attribute or question. The additional evaluation information may contain a detailed description about how the evaluation rating was determined.

A user is prompted for a category of products and a election is received 318. One or more of the questions received in step 314 and associated with the product category selected in step 318 are displayed to the user 320. The user's responses are received from the user and a representation of the response is stored 322. In one embodiment, the weight corresponding to the actual response selected is stored to represent the response. The preferences are calculated 324 to produce a product score as described above. The products and attributes are organized and assigned an order 326 as described above, with the products having the highest preference score organized and ordered in the order of the preference score, highest to lowest or vice versa. Attributes are ordered in the order of the weight identified in step 322, highest to lowest in one embodiment and lowest to highest in another embodiment. Some or all of the information received in step 310 for each product in that is in the category selected in step 318, including the product name and attribute ratings, are displayed 328 as described above according to the organization of step 326. Product scores calculated in step 324 are displayed as described above according to the organization of step 326.

The user may be prompted 330 for additional commands, and such a command may be received 332. It is not necessary to prompt 330 for such a command, because the user may not require such a prompt in order to provide the command received in step 332, for example if a pull-down menu is used to provide the command, or if single clicking on an area of the screen is used to provide the command, as described above.

If the command received in step 332 indicates the user wishes to order a product 344, an order for the product is placed 342. An order for a product may be placed by printing it, storing it, or transmitting it to a remote device.

If the command received in step 332 indicates the user wishes to change 334 the responses to some or all of the questions for the category selected in step 318, the method repeats at step 320 with the questions corresponding to the attributes to be changed displayed, and the weights for those attributes updated with the most recent selections.

If the command received in step 332 indicates the user desires to change 336 the category of products, the method continues at step 318.

If the command received in step 332 indicates the user desires additional information, 338 such as additional information about a product, received in step 310, additional information about an attribute, received in step 312, additional information about the meaning of a question, received in step 314 or additional information about an evaluation rating, received in step 316, the desired information is displayed 340 and the method repeats at step 330 or 328 as selected by the user 346. If the user does not desire to change the relevance or category and does not desire to see additional information, the method terminates 350 in one embodiment, or continues at step 310 in another embodiment.

What is claimed is:

1. A system for providing information about a plurality of products, each having a plurality of attributes and a product name, the system comprising:

an evaluation storage operatively coupled for receiving at an input, storing and providing at an output, for each of the plurality of products at least one evaluation score for each of the attributes said product;

a preference calculator having a first input operatively coupled for receiving at least one preference for each of the plurality of attributes and a second input coupled to the evaluation storage for receiving the at least one evaluation score for each of the attributes of the plurality of products, the preference calculator for computing and providing at an output at least one product score for each of the plurality of products, the product score responsive to at least one product of at least one of the at least one preference received at the preference calculator first input and at least one of the at least one evaluation score received at the preference calculator second input; and an administration having a first input operatively coupled for receiving a product name of each of at least one of the plurality of products and a second input coupled to the preference calculator output for receiving the at least one product score, the administration for providing, responsive to the at least one product score, to a user at an output, for each of a plurality of the plurality of products, the product name received at the administration first input.

2. The system of claim 1 wherein the administration provides the product name of each of the plurality of the plurality of products in an order of the product score received.

3. The system of claim 1 wherein the administration additionally comprises a third input operatively coupled for receiving an identifier of a set of at least one of the plurality of products having a name provided at the administration output, the administration additionally for providing at an order output order information for the set of at least one product to cause an order to be placed for the set of at least one product.

4. The system of claim 3, additionally comprising a remote interface having an input coupled to the administration order output for receiving the order information, the remote interface for providing the order information at an output coupled to a remote device.

5. The system of claim 1, wherein the administration has a preference input operatively coupled for receiving the at least one preference and an attribute information input for receiving information related to a plurality of the plurality of attributes, the administration additionally for providing at the administration output the attribute information received at the attribute information input responsive to the at least one preference received at the preference input.

6. The system of claim 5 wherein the administration receives at the preference input a plurality of preferences and provides the attribute information at the administration output responsive to an order of said plurality of preferences.

7. The system of claim 1, wherein the administration additionally comprises an additional information input operatively coupled for receiving additional information about how at least one of the at least one evaluation scores was derived, the administration additionally for providing said additional information at the administration output.

8. A method of displaying information about a plurality of products, each of the products having a plurality of attributes and a product name, the method comprising:

receiving an evaluation score for each of the plurality of attributes of each of the plurality of products;

receiving a preference for each of the plurality of the attributes;

for each of the plurality of products, computing a product score responsive to at least one product of the received evaluation score of said product and the received preferences; and providing the name of each of the plurality of products responsive to the product score computed.

9. The method of claim 8, wherein the providing step is responsive to an order of the product score computed.

10. The method of claim 8, additionally comprising placing an order for at least one of the plurality of products having a name provided.

11. The method of claim 10 wherein the placing the order step comprises transmitting the order to a remote device.

12. The method of claim 8 additionally comprising providing attribute information corresponding to at least one of the plurality of attributes responsive to the preference for the at least one attribute corresponding to the attribute information.

13. The method of claim 12 wherein the providing attribute information step is responsive to an order of the preferences.

14. The method of claim 8 additionally comprising displaying additional information about how at least one of the evaluation scores was derived.

15. A computer program product comprising a computer useable medium having computer readable program code embodied therein for displaying information about a plurality of products, each of the products having a plurality of attributes and a product name, the computer program product comprising:

computer readable program code devices configured to cause a computer to receive an evaluation score for each of the plurality of attributes of each of the plurality of products;

computer readable program code devices configured to cause a computer to receive a preference for each of the plurality of the attributes;

computer readable program code devices configured to cause a computer to compute for each of the plurality of products, a product score responsive to at least one product of the received evaluation score of said product and the received preferences; and computer readable program code devices configured to cause a computer to provide the name of each of the plurality of products responsive to the product score computed.

16. The computer program product of claim 15, wherein the computer readable program code devices configured to cause a computer to provide are responsive to an order of the product score computed.

17. The computer program product of claim 15, additionally comprising computer readable program code devices configured to cause a computer to place an order for at least one of the plurality of products having a name provided.

18. The computer program product of claim 17 wherein the computer readable program code devices configured to cause a computer to place the order comprise computer readable program code devices configured to cause a computer to transmit the order to a remote device.

19. The computer program product of claim 15 additionally comprising computer readable program code devices configured to cause a computer to provide attribute information corresponding to at least one of the plurality of attributes responsive to the preference for the at least one attribute corresponding to the attribute information.

20. The computer program product of claim 19 wherein the computer readable program code devices configured to cause a computer to provide attribute information are responsive to an order of the preferences.

21. The computer program product of claim 15 additionally comprising computer readable program code devices configured to cause a computer to display additional information about how at least one of the evaluation scores was derived.

* * * * *